US012581255B2

(12) United States Patent
Clark

(10) Patent No.: US 12,581,255 B2
(45) Date of Patent: Mar. 17, 2026

(54) SYSTEMS AND METHODS FOR ASSESSING HEARING HEALTH BASED ON PERCEPTUAL PROCESSING

(71) Applicant: Mimi Hearing Technologies GmbH, Berlin (DE)

(72) Inventor: Nicholas R. Clark, Royston (GB)

(73) Assignee: Mimi Hearing Technologies GmbH, Berlin (DE)

( * ) Notice: Subject to any disclaimer, the term of this patent is extended or adjusted under 35 U.S.C. 154(b) by 468 days.

(21) Appl. No.: 18/080,608

(22) Filed: Dec. 13, 2022

(65) Prior Publication Data

US 2024/0196143 A1 Jun. 13, 2024

(51) Int. Cl.
*H04R 25/00* (2006.01)

(52) U.S. Cl.
CPC ........... *H04R 25/70* (2013.01); *H04R 25/505* (2013.01)

(58) Field of Classification Search
CPC ...... H04R 25/70; H04R 25/50; H04R 25/505; A61B 5/123
See application file for complete search history.

(56) References Cited

U.S. PATENT DOCUMENTS

| | | | | |
|---|---|---|---|---|
| 10,595,135 | B2 * | 3/2020 | Li | H04R 25/70 |
| 11,265,659 | B2 * | 3/2022 | Zukic | H04R 25/505 |
| 2008/0165980 | A1 | 7/2008 | Pavlovic et al. | |
| 2020/0315498 | A1 * | 10/2020 | Knook | G10L 25/18 |

FOREIGN PATENT DOCUMENTS

| | | | |
|---|---|---|---|
| DE | 102007029224 | A1 | 1/2009 |
| EP | 3584927 | A1 | 12/2019 |
| EP | 3718476 | B1 | 7/2023 |
| WO | 2019200384 | A1 | 10/2019 |

OTHER PUBLICATIONS

Extended European Search Report mailed on Aug. 21, 2023, in related European Patent Application No. 23159267.6, 7 pages.

* cited by examiner

*Primary Examiner* — Vivian C Chin
*Assistant Examiner* — Annabelle Kang
(74) *Attorney, Agent, or Firm* — Polsinelli PC

(57) ABSTRACT

Described are techniques for audio processing. For instance, a process can include obtaining a first set of digital signal processing (DSP) parameters associated with a first hearing profile and a second set of DSP parameters associated with a second hearing profile different than the first hearing profile. One or more differentially processed audio samples can be output, each including a first audio output signal generated by processing a first audio signal using the first set of DSP parameters and a second audio output signal generated by processing a second audio signal using the second set of DSP parameters. For each differentially processed audio sample, a user input can be obtained indicative of the first or second audio output signal having a lower audio quality. One or more user hearing thresholds can be determined based on the respective user input obtained for each respective differentially processed audio sample.

20 Claims, 10 Drawing Sheets

SYSTEMS AND METHODS FOR ASSESSING HEARING HEALTH BASED ON PERCEPTUAL PROCESSING

FIELD OF INVENTION

This invention relates generally to the field of audio engineering, digital signal processing and audiology and more specifically to systems and methods for assessing hearing health using perceptual processing.

BACKGROUND

Perceptual coders work on the principle of exploiting perceptually relevant information ("PRI") to reduce the data rate of encoded audio material. Perceptually irrelevant information, information that would not be heard by an individual (e.g., a listener), is discarded in order to reduce data rate while maintaining listening quality of the encoded audio. These "lossy" perceptual audio encoders are based on a psychoacoustic model of an ideal listener, a "golden ears" standard of normal hearing. To this extent, audio files are intended to be encoded once, and then decoded using a generic decoder to make them suitable for consumption by all.

However, the psychoacoustic model need not be based on the hearing profile of an ideal listener, but that of any aged listener. To this extent, it is possible that an audio sample may be encoded or processed based on an assumption of hearing age. For example, when played back side-by-side to that of the "ideal listener" audio sample, a listener with healthy hearing would perceive a noticeable change or difference. What is indistinguishable to a 70-year-old listener would be distinguishable to a listener with better hearing. This then could provide the basis for a more intuitive and tangible approach for testing hearing.

SUMMARY

In one illustrative example, a method for audio processing is provided, the method comprising: obtaining a first set of digital signal processing (DSP) parameters associated with a first hearing profile; obtaining a second set of DSP parameters associated with a second hearing profile different than the first hearing profile; outputting one or more differentially processed audio samples, each respective differentially processed audio sample of the one or more differentially processed audio samples including: a first audio output signal generated based on processing a first audio signal using the first set of DSP parameters; and a second audio output signal generated based on processing a second audio signal using the second set of DSP parameters; obtaining, for each respective differentially processed audio sample, a respective user input indicative of the first audio output signal having a lower audio quality or indicative of the second audio output signal having a lower audio quality; and determining one or more user hearing thresholds based on the respective user input obtained for each respective differentially processed audio sample.

In another illustrative example, an apparatus for processing audio data is provided, the apparatus comprising: at least one memory; and at least one processor coupled to the at least one memory, the at least one processor configured to: obtain a first set of digital signal processing (DSP) parameters associated with a first hearing profile; obtain a second set of DSP parameters associated with a second hearing profile different than the first hearing profile; output one or more differentially processed audio samples, each respective differentially processed audio sample of the one or more differentially processed audio samples including: a first audio output signal generated based on processing a first audio signal using the first set of DSP parameters; and a second audio output signal generated based on processing a second audio signal using the second set of DSP parameters; obtain, for each respective differentially processed audio sample, a respective user input indicative of the first audio output signal having a lower audio quality or indicative of the second audio output signal having a lower audio quality; and determine one or more user hearing thresholds based on the respective user input obtained for each respective differentially processed audio sample.

Unless otherwise defined, all technical terms used herein have the same meaning as commonly understood by one of ordinary skill in the art to which this technology belongs.

The term "audio device", as used herein, may refer to any device that outputs audio, including, but not limited to: mobile phones, computers, televisions, hearing aids, headphones and/or speaker systems, etc.

The term "hearing profile", as used herein, may refer to an individual's hearing data (e.g., a listener's hearing data) attained, for example, through: administration of a hearing test or tests, from a previously administered hearing test or tests attained from a server or from a user's device, or from an individual's sociodemographic information, such as from their age and sex, potentially in combination with personal test data. The hearing profile may be in the form of an audiogram and/or from a suprathreshold test, such as a psychophysical tuning curve test or masked threshold test, etc.

The term "masking thresholds", as used herein, may refer to the intensity of a sound required to make that sound audible in the presence of a masking sound. Masking may occur before onset of the masker (e.g., backward masking), but more significantly, may occur simultaneously (e.g., simultaneous masking) and/or following the occurrence of a masking signal (e.g., forward masking). Masking thresholds can depend on one or more of the type of masker (e.g., tonal or noise), the kind of sound being masked (e.g., tonal or noise), and/or on the frequency. For example, noise may more effectively mask a tone than a tone masks a noise. Additionally, masking may be most effective within the same critical band (e.g., between two sounds close in frequency). Individuals or listeners with sensorineural hearing impairment typically display wider, more elevated masking thresholds relative to normal hearing individuals or listeners. To this extent, a wider frequency range of off frequency sounds can mask a given sound.

Masking thresholds may be described as a function in the form of a masking contour curve. A masking contour is typically a function of the effectiveness of a masker in terms of intensity required to mask a signal, or probe tone, versus the frequency difference between the masker and the signal or probe tone. A masker contour can be a representation of a listener's cochlear spectral resolution for a given frequency (e.g., place along the cochlear partition). The masker contour can be determined by a behavioral test of cochlear tuning rather than a direct measure of cochlear activity using laser interferometry of cochlear motion. A masking contour may also be referred to as a psychophysical or psychoacoustic tuning curve (PTC). Such a curve may be derived from one of a number of types of tests: for example, a masking contour or PTC may be determined, for example, based on one or more of Brian Moore's fast PTC, Patterson's notched noise method, and/or any similar PTC methodology, as would be appreciated by one of ordinary skill in the art. Other methods may additionally, or alternatively, be used to measure masking thresholds, such as through an inverted PTC paradigm, wherein a masking probe is fixed at a given frequency and a tone probe is swept through the audible frequency range (e.g., a masking threshold test).

The term "hearing thresholds", as used herein, may refer to the minimum sound level of a pure tone that a listener can hear with no other sound present. This minimum sound level may also be known as the "absolute threshold" of hearing. Individuals (e.g., listeners) with sensorineural hearing impairment typically display elevated hearing thresholds relative to normal hearing individuals or listeners. Absolute thresholds are typically displayed in the form of an audiogram.

The term "masking threshold curve", as used herein, may refer to the combination of a listener's masking contour and the listener's absolute thresholds.

The term "perceptual relevant information" or "PRI", as used herein, may refer to a general measure of the information rate that can be transferred to a receiver for a given piece of audio content after taking into consideration what information will be inaudible (e.g., inaudible due to having amplitudes below the hearing threshold of the listener, due to masking from other components of the signal, etc.). The PRI information rate can be described in units of bits per second (e.g., bits/second).

The term "perceptual rescue", as used herein, may refer to a general measure of the net increase in PRI that a digital signal processing algorithm offers for a given audio sample for a listener. Perceptual rescue can be achieved by increasing the audibility of an audio signal and can result, for instance, in an increase in the units (e.g., PRI information rate) of bits per second (bits/second).

The term "multi-band compression system", as used herein, may generally refer to any processing system that spectrally decomposes an incoming audio signal and processes each subband signal separately. Different multi-band compression configurations may be possible, including, but not limited to: those found in simple hearing aid algorithms, those that include feedforward and feedback compressors within each subband signal (see, e.g., commonly owned European Patent Application 18178873.8), and/or those that include or otherwise perform parallel compression (e.g., wet/dry mixing).

The term "threshold parameter", as used herein, may generally refer to the level, typically decibels Full Scale (dB FS), above which compression is applied in a DRC.

The term "ratio parameter", as used herein, may generally refer to the gain (e.g., if the ratio is larger than 1) or attenuation (e.g., if the ratio is a fraction between zero and one) per decibel exceeding the compression threshold. In some embodiments, the ratio may comprise a fraction between zero and one.

The term "imperceptible audio data", as used herein, may generally refer to any audio information an individual (e.g., listener) cannot perceive, such as audio content with one or more amplitudes below hearing and/or masking thresholds of the listener. Due to raised hearing thresholds and broader masking curves, individuals (e.g., listeners) with sensorineural hearing impairment typically cannot perceive as much relevant audio information as a normal hearing individual/listener within a complex audio signal. In this instance, perceptually relevant information is reduced.

The term "frequency domain transformation", as used herein, may refer to the transformation of an audio signal from the time domain to the frequency domain, in which component frequencies are spread across the frequency spectrum. For example, a Fourier transform can be used to convert a time domain signal into an integral of sine waves of different frequencies, each of which represents a different frequency component of the input time domain signal.

The phrase "computer readable storage medium", as used herein, may refer to a solid, non-transitory storage medium. A computer readable storage medium may additionally or alternatively be a physical storage place in a server accessible by a user or listener (e.g., to download for installation of the computer program on her device or for cloud computing).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understand that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1A:
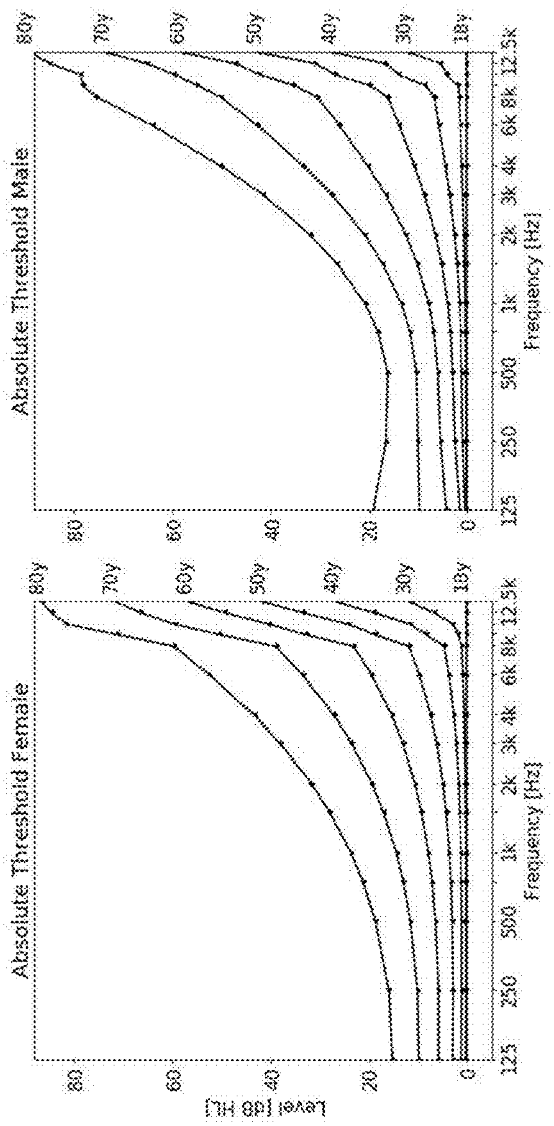
FIG. 1A illustrates graphs depicting examples of the deterioration of human audiograms and representative absolute hearing thresholds with advancing age.

Various example embodiments of the disclosure are discussed in detail below. While specific implementations are discussed, it should be understood that these are described for illustration purposes only. A person skilled in the relevant art will recognize that other components and configurations may be used without parting from the spirit and scope of the disclosure.

Thus, the following description and drawings are illustrative and are not to be construed as limiting the scope of the embodiments described herein. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It should be further noted that the description and drawings merely illustrate the principles of the proposed device. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed device. Furthermore, all statements herein providing principles, aspects, and embodiments of the invention, as well as specific examples thereof, are intended to encompass equivalents thereof.

Figure 1B:
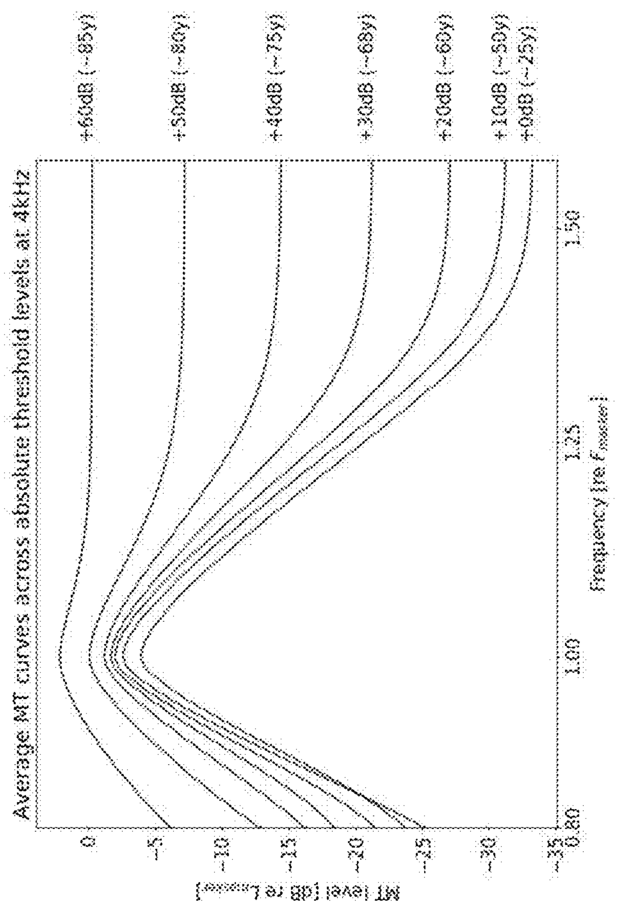
FIG. 1B illustrates a graph depicting an example of the deterioration of masking thresholds with age, showing a marked broadening based on age.

The disclosure turns now to FIGS. 1A and 1B, which underscore the importance of sound personalization, for example by illustrating the deterioration of a listener's hearing ability over time. Past the age of 20 years old, humans begin to lose their ability to hear higher frequencies, as illustrated by FIG. 1A (albeit above the spectrum of human voice). The loss of the ability to hear higher frequencies has been observed to steadily become worse with age, as noticeable declines within the speech frequency spectrum are apparent around the age of 50 or 60. However, these pure tone audiometry findings mask a more complex problem as the human ability to understand speech may decline much earlier.

For example, although hearing loss typically begins at higher frequencies, listeners who are aware that they have hearing loss do not typically complain about the absence of high frequency sounds. Instead, such listeners may report difficulties listening in a noisy environment and in hearing out the details in a complex mixture of sounds, such as in a telephone call. In essence, off-frequency sounds can more readily mask a frequency of interest for hearing-impaired (HI) individuals (e.g., HI listeners)—conversation that was once clear and rich in detail becomes muddled. As hearing deteriorates, the signal-conditioning capabilities of the ear begin to break down, and thus hearing-impaired listeners need to expend more mental effort to make sense of sounds of interest in complex acoustic scenes (or miss the information entirely). A raised threshold in an audiogram is not merely a reduction in aural sensitivity, but a result of the malfunction of some deeper processes within the auditory system that have implications beyond the detection of faint sounds.

To this extent, FIG. 1B illustrates key, discernable age trends in suprathreshold hearing. Through the collection of large datasets, key age trends can be ascertained, allowing for the accurate parameterization of personalization DSP algorithms. In a multiband compressive system, for example, the threshold and ratio values of each sub-band signal dynamic range compressor (DRC) can be modified to reduce problematic areas of frequency masking, while post-compression sub-band signal gain can be further applied in the relevant areas. In some aspects, the masked threshold (MT) curves depicted in FIG. 1B can be seen to represent a similar paradigm for measuring masked thresholds. In one illustrative example, a narrow band of noise (e.g., in this instance around 4 kHz), is fixed while a probe tone sweeps from 50% of the noise band center frequency to 150% of the noise band center frequency. Again, key age trends can be ascertained from the collection of large MT datasets.

Multiband dynamic processors can be used to improve hearing impairments. In various approaches to the fitting of a DSP algorithm based on a listener's hearing thresholds, there may be multiple parameters that can be altered, the combination of which can be selected to lead to or otherwise achieve a desired outcome. In example systems that include one or more multiband dynamic range compressors, these adjustable parameters often include at least a compression threshold and a compression ratio for each band (e.g., subband). For example, compression thresholds can be used to determine (e.g., set or configure) an audio level at which a compressor becomes active. Compression ratios can be used to determine (e.g., set or configure) how strongly the compressor reacts when applying or performing compression. In some aspects, compression can be applied to attenuate one or more portions of an input audio signal (e.g., such as portions of the input audio signal which exceed certain levels) and/or to lift one or more portions of the input audio signal (e.g., such as portions of the input audio signal that are lower that certain levels) via amplification. For example, compression can be implemented using one or more gain stages in which a gain level can be added to each band or subband.

In some embodiments perceptual coding can additionally, or alternatively, be performed based on one or more parameters that are associated with or otherwise characterize a listener's hearing ability. For example, perceptually irrelevant information can be identified as information that is included in an input audio signal but would not be heard (e.g., would not be perceptible) by a given listener. Perceptually irrelevant information can be identified or determined based on the parameters that characterize the given listener's hearing ability. In some cases, after identifying perceptually irrelevant information in an input audio signal, the perceptually irrelevant information can be discarded in order to reduce the data rate of an output audio signal (e.g., based on the observation that the perceptually irrelevant information is 'extraneous' information for the given listener, as the given listener would be unable to hear or discern the perceptually irrelevant even if it were to be included in the output audio signal).

Perceptually relevant information (PRI) can include the information in an input audio signal that will be discernable to (e.g., heard by) the given listener. For example, an input audio signal can be divided into PRI and perceptually irrelevant information. The perceptually irrelevant information may be discarded, as mentioned previously. The output audio signal can therefore be generated to include only PRI. In some cases, a perceptual audio encoder can discard perceptually irrelevant information while maintaining the listening quality of the encoded audio (e.g., the PRI). For example, a "lossy" perceptual audio encoder can be implemented based on a psychoacoustic model of an ideal listener standard of normal hearing.

In some aspects, a perceptual audio encoder can instead be implemented using a psychoacoustic model or hearing profile that corresponds to an aged listener (e.g., a 40-year-old, 50-year-old, 60-year-old, etc., listener rather than an ideal listener). In such an example, an output audio signal can be generated (e.g., encoded or processed) based on an assumption of hearing age, wherein the assumption of hearing age is reflected in the choice of psychoacoustic model/hearing profile used to implement the perceptual audio encoder.

In other words, the choice or assumption of hearing age used to implement a perceptual audio encoder can be used to encode or process an input audio sample such that any listener (e.g., of any hearing age/profile, including the ideal hearing profile) will perceive the output audio sample in the same or similar manner as if the listener were of the chosen hearing age. For instance, if a 70-year-old hearing age/profile is used to implement the perceptual audio encoder, a listener with healthy hearing would perceive a noticeable change—in particular, the listener with healthy hearing would perceive the output audio sample as if the listener themselves had a 70-year-old hearing age/profile.

In other words, when played back side-by-side with the "ideal listener" audio sample (e.g., generating using a perceptual audio encoder implementing the ideal hearing profile), the listener with healthy hearing will perceive a noticeable difference when compared to the 70-year-old hearing age output audio sample.

By contrast, the "ideal listener" audio sample and the 70-year-old hearing age output audio sample will be indistinguishable to a listener who actually has a 70-year-old hearing age. Accordingly, it is contemplated herein that a perceptual processing hearing ability test can be performed for a given listener based on the user's ability (or inability) to identify differences between first and second audio samples that are each generated with different hearing age baselines. As will be described in greater depth below, a testing paradigm can be implemented to more intuitively and tangibly determine the hearing ability (e.g., hearing age) of a given listener, based at least in part on a series of user inputs comprising a selection between two or more audio samples that have been encoded (e.g., using a perceptual audio encoder) to have different hearing ages. For example, the given listener can be prompted to select the processed audio sample perceived as having the greatest audio quality (e.g., the processed audio sample having the youngest perceptually encoded hearing age), the processed audio sample perceived as having the lowest audio quality (e.g., the processed audio sample having the oldest perceptually encoded hearing age), or some combination of the two.

Figure 2:
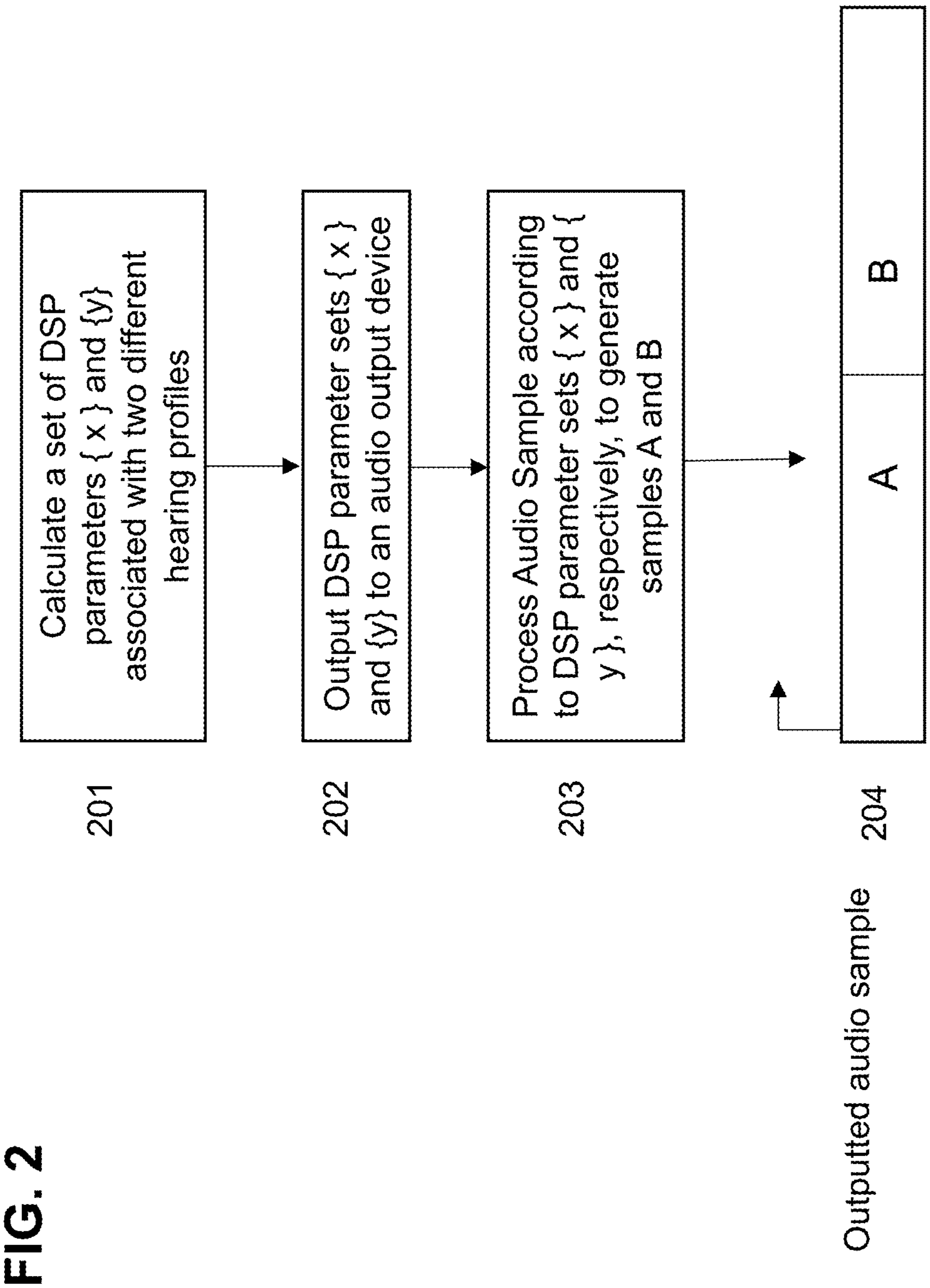
FIG. 2 illustrates a flow chart of an example method for testing an individual's hearing ability using perceptual processing, according to one or more aspects of the present disclosure.

For example, FIG. 2 illustrates a flow chart of an example method that can be used to perform the presently disclosed perceptual processing hearing ability test, according to one or more aspects of the present disclosure.

At block 201, a first and second set of DSP parameters can be calculated for a respective first and second hearing profile. For example, the first set of DSP parameters, {x} can be calculated or otherwise determined for a first hearing profile that is associated with a first hearing age. The second set of DSP parameters, {y}, can be calculated or otherwise determined for a second hearing profile that is associated with a second hearing age that is different (e.g., older or younger) than the first hearing age. In some embodiments, one of the first hearing profile and the second hearing profile can be an "ideal" hearing profile of normal/healthy hearing, as described previously. In such cases, the remaining hearing profile will always be associated with a hearing age that is older or perceptually "worse" than the ideal hearing profile.

At block 202, the first and second DSP parameter sets (e.g., {x} and {y}, respectively) can be output to an audio output device. In some embodiments, one or more (or both) of the first and second set of DSP parameters can be calculated or otherwise determined locally. For example, a mobile computing device or other audio playback device associated with a listener can be used to calculate or determine one or more (or both) of the first and second set of DSP parameters. The first and second set of DSP parameters can additionally, or alternatively, be calculated remotely (e.g., remote from the listener's computing device or audio playback device). For example, DSP parameter sets can be calculated in substantially real-time (e.g., in on-demand fashion) and transmitted to a listener's device in response to one or more requests. In some aspects, DSP parameter sets can be calculated in advance and stored until needed or otherwise requested for use in performing the presently disclosed perceptual processing hearing ability test.

In some examples, one or more (or both) of the first and second set of DSP parameters can be calculated or determined based on a combination of a local device (e.g., a listener's mobile computing device or audio playback device) and a remote device (e.g., a server or other remote computing device). For example, the listener's device may be used to perform the presently disclosed perceptual processing hearing ability test, wherein the listener's device outputs processed audio samples to the listener and obtains corresponding feedback or input from the listener. In some cases, the first and second set of DSP parameters (e.g., indicated in FIG. 2 as the DSP parameter sets {x} and {y}) can each correspond to a different hearing age. For example, the first set of DSP parameters, {x}, may correspond to the listener's actual hearing age while the second set of DSP parameters, {y}, may correspond to a hearing age that is older than the listener's actual age. In some examples, {x} can correspond to an ideal hearing profile, as described previously.

In some embodiments, the listener's computing device can store a plurality of DSP parameter sets, e.g., corresponding to a plurality of different hearing profiles and/or hearing ages. In such examples, the listener's computing device can perform the presently disclosed perceptual processing hearing ability test by retrieving the stored or pre-determined DSP parameter sets as needed. For instance, if the perceptual processing hearing ability test requests DSP parameters for generating an audio sample to simulate a 70-year-old hearing age, the listener's device can request, retrieve, or otherwise obtain the corresponding DSP parameters for a 70-year-old hearing age profile.

In some embodiments, in addition to retrieving DSP parameters corresponding to a particular hearing age/profile from local storage or memory, a listener's computing device can transmit a same or similar request to a server or other remote computing device. For example, the listener's computing device can transmit a request to a server for DSP parameters corresponding to a 70-year-old hearing age profile.

At block 203, the method includes processing an audio sample according to the first and second DSP parameter sets (e.g., {x} and {y}, respectively). For example, the audio sample can be processed based on or using the DSP parameter sets {x} and {y} to generate a respective first audio output sample and second audio output sample. In one illustrative example, the first DSP parameter set {x} can be applied to the input audio sample in order to generate an audio output sample A, and the second DSP parameter set {y} can be applied to the same input audio sample in order to generate an audio output sample B. In other words, audio output samples A and B can be generated from the same input audio sample. However, audio output sample A is processed using the first DSP parameter set {x} and audio output sample B is processed using the second DSP parameter set {y}.

In some embodiments, the first DSP parameter set {x} can be applied to a first portion of the input audio sample, while the second DSP parameter set {y} is applied to a second portion of the input audio sample. For example, the DSP parameters {x} can be applied to the first half of a given input audio sample and the DSP parameters {y} can be applied to the second half of the same given input audio sample. The DSP parameters {x} and {y} can be applied to non-overlapping portions of the given input audio sample and/or can be applied to overlapping portions of the given input audio sample (noting that the fully overlapping case can be the same or similar as the scenario in which the DSP parameters {x} and {y} are both applied to the same input audio sample). In still further embodiments, the DSP parameter sets {x} and {y} can each be applied to different input audio samples, without departing from the scope of the present disclosure. In some aspects, the input audio sample (s) can be held constant through various rounds of the presently disclosed perceptual processing hearing ability test, although it is also possible for the input audio sample(s) to vary. In some embodiments, the input audio sample(s) used to perform the presently disclosed perceptual processing hearing ability test can be pre-determined, selected by a user from a pre-determined set of available audio sample options, or selected and uploaded by a user, etc. In other words, it is contemplated that the DSP parameter sets {x} and {y} can be applied to the same input audio sample, can be applied to different portions of the same input audio sample, can be applied to different audio samples, etc., in various configurations without departing from the scope of the present disclosure.

At block 204, the outputted audio samples A and B can be presented for playback by a user (e.g., also referred to as a "listener"). For example, the same audio output device that received the DSP parameter sets {x} and {y} at block 202 can be used to present or playback the processed/outputted audio samples A and B at block 204.

As will be explained in greater depth below, the listener can be presented with the audio samples A and B in sequential or consecutive order, and then asked to provide a user input indicating which of the two audio samples has the better (or the worse) perceived quality. Recalling that both of the output audio samples A and B may be generated based on the same input audio sample, in some aspects it is contemplated that the perceived differences between the two output samples A and B can therefore be attributed to the listener's ability to perceive differences between the first hearing age/profile applied to the input audio sample via the DSP parameters {x} vs. the second hearing age/profile applied to the same input audio sample via the DSP parameters {y}.

In some embodiments, a series of differentially processed output audio samples can be presented to the user by returning to block 201 (e.g., after receiving a user selection or input between the two processed output audio samples A and B that are presented at block 204). In one illustrative example, the selection of one or more (or both) of the hearing profiles (e.g., hearing ages) that are used to generate the DSP parameters {x} and {y} for a subsequent iteration of the method can be determined based at least in part on the listener's selection or feedback that is provided at block 204 of the immediately prior iteration of the method.

Figure 3B:
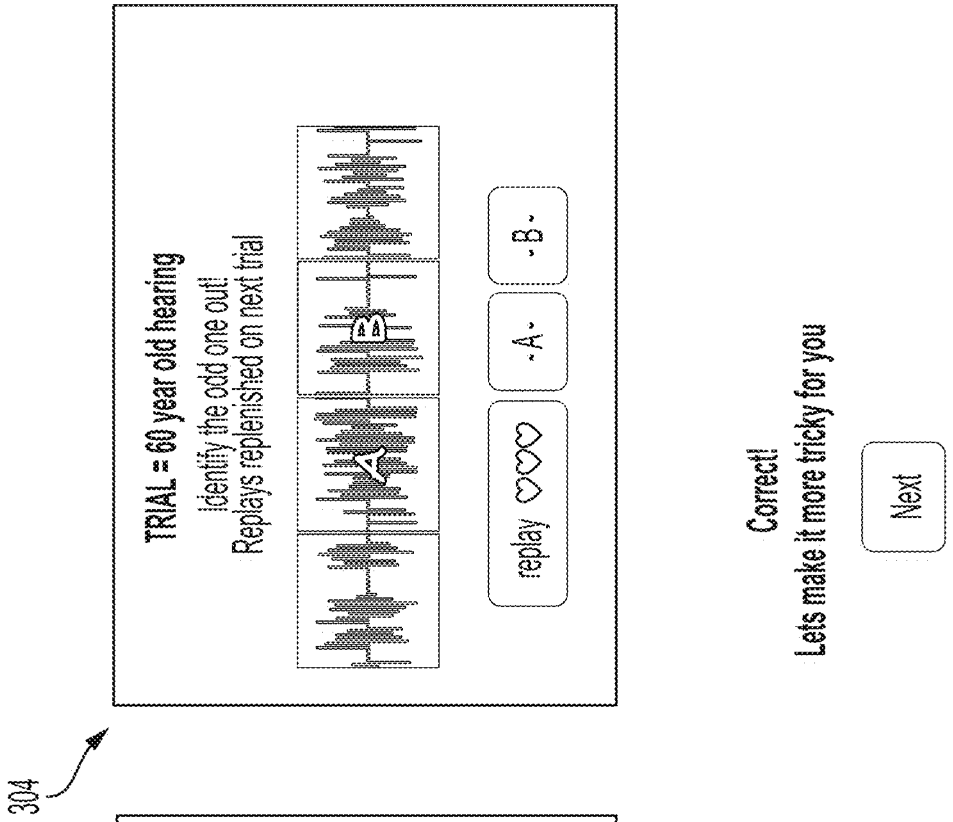
FIG. 3B illustrates an example user interface that may be used to conduct a second hearing age trial associated with a perceptual processing hearing ability test, according to one or more aspects of the present disclosure.
Figure 3A:
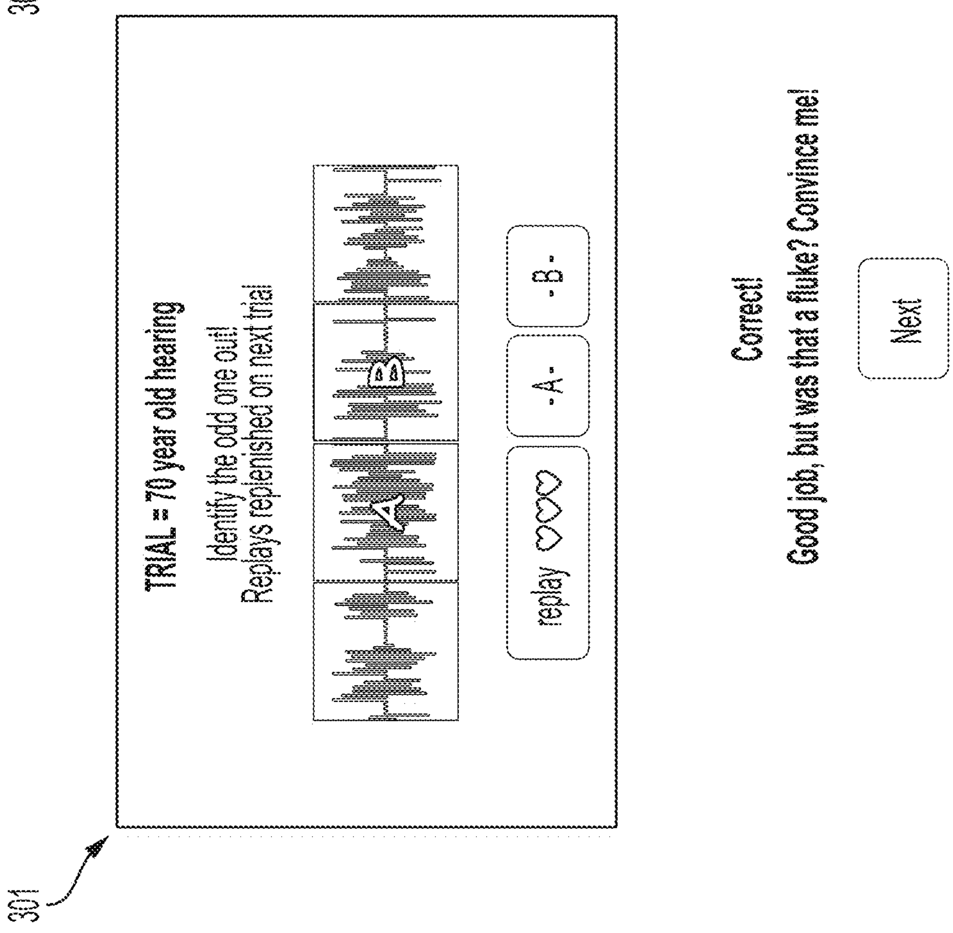
FIG. 3A illustrates an example user interface that may be used to conduct a first hearing age trial associated with a perceptual processing hearing ability test, according to one or more aspects of the present disclosure.

FIGS. 3A and 3B illustrate an example user interface that may be utilized to conduct the presently disclosed perceptual processing hearing ability test. For example, FIG. 3A depicts a first hearing trial 301 in which a listener is tested on his or her ability to perceive or detect an output audio sample (e.g., one of 'A' or 'B') that has been processed to simulate the hearing ability of a 70-year-old; FIG. 3B depicts a second hearing trial 304 in which a listener is tested on his or her ability to perceive or detect an output audio sample (e.g., again labeled 'A' or 'B') that has been processed to simulate the hearing ability of a 60-year-old.

In general, the presently disclosed perceptual processing hearing ability test can be performed based on prompting a user (e.g., listener) to make a selection between two or more audio samples that have been differentially processed based on different hearing profiles/ages. It is noted that although the examples of FIGS. 3A and 3B depict a scenario in which a user makes a selection between only two processed audio samples 'A' and 'B', a greater or lesser number of processed audio samples can be presented for selection without departing from the scope of the present disclosure. Similarly, in the examples of FIGS. 3A and 3B, the same number of processed audio samples (e.g., two) is presented in each successive round or trial of the perceptual processing hearing ability test, although it is noted that it is also possible for the number of processed audio samples to vary from round-to-round and/or based on whether a user provided a correct or incorrect response in one or more of the immediately prior rounds.

As illustrated, two processed audio samples, A and B, are played back-to-back and the listener is prompted to choose the odd one out, e.g., the processed audio sample with worse perceived quality. The processed audio samples A and B can be generated as described above with respect to FIG. 2, such that one of the processed audio samples corresponds to the hearing age being tested in the current round (e.g., tested hearing age=70 in the hearing trial 301 of FIG. 3A, and tested hearing age=60 in the hearing trial 304 of FIG. 3B). In some embodiments, the remaining processed audio sample can correspond to an "ideal" hearing profile or hearing age, such as a hearing age of 18. However, it is noted that the remaining processed audio sample (e.g., the processed audio sample that is not generated based on the hearing age being tested in the current round) can be set to various other hearing ages and/or hearing profiles as desired, so long as the two processed audio samples 'A' and 'B' are processed differently.

In some embodiments, the processed audio sample corresponding to the hearing age being tested in the current round may also be referred to as the "simulated hearing age audio sample" or the "simulated hearing age sample," while the remaining processed audio sample (e.g., corresponding to an "ideal" hearing profile/age, such as hearing age 18) can be referred to as the "baseline hearing age audio sample" or the "baseline audio sample." In some embodiments, the baseline hearing age audio sample can be generated to correspond to the aforementioned "ideal" hearing profile, or a hearing age of 18-years-old, etc.

As illustrated, the simulated hearing age sample and the baseline hearing age sample can be randomly presented in each round, such that in some rounds sample A is the simulated hearing age sample and sample B is the baseline hearing age sample, while in other rounds sample B is the simulated hearing age sample and sample A is the baseline hearing age sample. In this or other manners, it is contemplated that the processed audio samples can be presented to the listener such that the listener is unaware of which processed audio sample is the simulated hearing age sample, and must make a selection based on his or her ability to perceive one or more differences between samples A and B.

In one illustrative example, the simulated hearing age sample and the baseline hearing age sample (e.g., samples A and B) can be generated from the same input audio track. As illustrated, the two samples can be generated from consecutive portions of the input audio track, such that the listener will hear processed audio sample B immediately after processed audio sample A. In some embodiments, the listener can be presented with an unprocessed portion of the audio sample before and/or after being presented with the consecutive processed audio samples A and B. For example, in the context of FIGS. 3A and 3B, the two hearing trials 301 and 304 can both be performed using the same input audio sample divided into four portions—the first portion of the input audio sample is played for the listener in an unprocessed fashion (or using some default processing); the second portion of the input audio sample is processed using either the simulated hearing age (e.g., corresponding to a 70-year-old hearing age in hearing trial 301 and a 60-year-old hearing age in hearing trial 304) or the baseline hearing sample; the third portion of the input audio sample is processed using whichever hearing age was not used previously; and the fourth portion of the input audio sample is played for the listener in an unprocessed fashion or using a default processing, in the same manner as the first portion of the input audio sample. In some embodiments, the beginning and ending portions of the audio that is presented to the user can be processed using the same hearing age or hearing profile that is used to generate the baseline hearing age test sample During the course of each hearing trial of the presently disclosed perceptual processing hearing ability test (e.g., hearing trials such as the 70-year-old hearing trial 301, the 60-year-old hearing trial 304, etc.), when a healthy listener listens to processed audio recreating the functional hearing of a 70-year-old, such audio may be perceived as lower quality than either the baseline hearing age sample used during the hearing trial and/or the beginning and ending "unprocessed" samples also used during the hearing trial.

For example, a healthy listener (or a listener with a hearing age lower than 70 years) might identify the simulated 70-year-old hearing age sample based on there being fewer details to be heard in the audio output due to the 70-year-old's increased hearing thresholds and broadened masking curves (e.g., both relative to the listeners more youthful true hearing age or ability). In other words, less hearing information perceived by a listener in this instance is what is perceived as less quality—in this instance, a more muffled playback.

In some embodiments, a listener may be presented with the playback of the entire audio sample (e.g., all four portions that are depicted in FIGS. 3A and 3B) before being permitted to make a selection indicating the listener's choice between either sample A or sample B representing the "odd one out." In some cases, the listener may additionally be provided with a 'replay' option, which triggers the system to repeat the playback of the same audio sample (e.g., the same four portions). As illustrated, the listener's ability to select or utilize the 'replay' option may be limited to some pre-determined number of times, such that the user is not able to continuously replay the audio sample in an attempt to detect a difference between sample A and sample B that was not immediately or clearly discernable (e.g., perceived or heard) by the listener. In some embodiments, the listener's remaining quantity of 'replay' selections can be reset periodically, for example in response to the user providing one or more incorrect responses in the immediately prior trial(s) of the presently disclosed perceptual processing hearing ability test.

In some embodiments, the presently disclosed perceptual processing hearing ability test can be performed based on tracking what are referred to as "reversals" in the answers or selections provided by the listener in response to consecutive trials or rounds of the hearing test. For example, the testing rounds can proceed based on an up/down procedure, in which a delta (e.g., differential) between the baseline hearing age sample and the simulated hearing age sample is increased or decreased (e.g., adjusted up or adjusted down) based on the listener's previous correct/incorrect answers in earlier trials.

In one illustrative example, the presently disclosed perceptual processing hearing ability test can begin with a relatively large step differential between the baseline and simulated hearing age samples. For example, in the context of FIG. 3A, an initial round of the hearing test could present an 18-year-old baseline hearing age sample as sample A and a 70-year-old simulated hearing age sample as sample B. Based on the relatively large differential between the 70-year-old hearing age and the 18-year-old hearing age, the listener will likely find it a relatively easy task to distinguish sample B as the "odd one out" for this initial round.

As the listener continues to provide correct answers (e.g., correctly selecting the simulated hearing age sample, and not the baseline hearing age sample, as the odd one out for a given round of the presently disclosed hearing test), the delta/differential between sample A and sample B can be decreased. In other words, as the listener continues to provide correct responses, the delta/differential between the simulated hearing age and the baseline hearing age can decrease.

In some embodiments, the presently disclosed perceptual processing hearing ability test can include an initial stage that is exited by the listener providing a pre-determined number of consecutive correct responses. For example, the initial stage can require a pre-determined number of consecutive correct responses (e.g., step size changes) that will provide a reasonable sensitivity. In some examples, the initial stage can be exited by the listener providing three correct responses in a row.

After exiting the initial stage, the presently disclosed perceptual processing hearing ability test can be performed by continuing to perform step size reductions (e.g., reducing the hearing age differential between samples A and B/the simulated and baseline hearing age samples) in response to the listener providing the correct answer for a given round of the hearing test. However, in response to the listener providing an incorrect answer for a given round of the hearing test (e.g., the listener fails to select the simulated hearing age sample as the "odd one out" and instead incorrectly selects what is actually the baseline hearing age sample as the "odd one out"), the step size can instead be increased (or in some embodiments, held constant).

This process of increasing and decreasing the step size between consecutive rounds of the hearing test can be performed until a pre-determined number of reversals occur. For example, a reversal may occur when the outcome of the listener's response (e.g., either incorrect or correct) for the current round is different than the outcome of the listener's response for the previous round. Additionally, in some embodiments the step size between rounds can be increased and/or decreased according to a 3-down-1-up procedure, a 2-down-1-up procedure, etc., in which the number of consecutive correct responses required to trigger a step size decrease is greater than the number of incorrect responses required to trigger a step size increase. For example, in a 3-down-1-up procedure, the step size will be decreased after the user provides three correct responses in a row, but will be increased after the user provides a single incorrect response. Similarly, in a 2-down-1-up procedure, the step size will be decreased after the user provides two correct responses in a row, but will be increased after the user provides a single incorrect response.

Provided below is an example of the multiple rounds that can be included in the presently disclosed perceptual processing hearing ability test, using a 2-down-1-up testing procedure as described above. Using hearing age as the parameter being tested/adjusted based on the step size adjustments, the example perceptual processing hearing ability test could proceed as depicted below in Table 1:

TABLE 1

Example perceptual processing hearing ability test

| ROUND | Baseline Hearing Age | Simulated Hearing Age | Listener Response? | |
|---|---|---|---|---|
| 1 | 18 | 80 | Correct | |
| 2 | 18 | 80 | Correct | |
| 2x consecutive correct → Adjust step size down by 20 | | | | |
| 3 | 18 | 60 | Correct | |
| 4 | 18 | 60 | Correct | |
| 2x consecutive correct → Adjust step size down by 20 | | | | |
| 5 | 18 | 40 | Correct | |
| 6 | 18 | 40 | INCORRECT | Reversal |
| 1x incorrect → Adjust step size up by 5 | | | | |
| 7 | 18 | 45 | INCORRECT | |
| 1x incorrect → Adjust step size up by 5 | | | | |
| 8 | 18 | 50 | Correct | Reversal |
| 9 | 18 | 50 | Correct | |
| 2x consecutive correct → Adjust step size down by 2.5 | | | | |
| 10 | 18 | 47.5 | Correct | |
| 11 | 18 | 47.5 | Correct | |
| 2x consecutive correct → Adjust step size down by 2.5 | | | | |
| 12 | 18 | 45 | Correct | |
| 13 | 18 | 45 | INCORRECT | Reversal |
| 1x incorrect → Adjust step size up by 2.5 | | | | |
| 14 | 18 | 47.5 | Correct | Reversal |
| 15 | 18 | 47.5 | Correct | |
| 2x consecutive correct → Adjust step size down by 2.5 | | | | |
| 16 | 18 | 45 | Correct | |
| 17 | 18 | 45 | Correct | |
| 2x consecutive correct → Adjust step size down by 2.5 | | | | |
| 18 | 18 | 42.5 | INCORRECT | Reversal |
| 1x incorrect → Adjust step size up by 2.5 | | | | |
| 19 | 18 | 45 | INCORRECT | |

TABLE 1-continued

| Example perceptual processing hearing ability test | | | | |
|---|---|---|---|---|
| ROUND | Baseline Hearing Age | Simulated Hearing Age | Listener Response? | |
| 1x incorrect → Adjust step size up by 2.5 | | | | |
| 20 | 18 | 47.5 | Correct | Reversal |
| 21 | 18 | 47.5 | Correct | |

In some embodiments, the presently disclosed perceptual processing hearing ability test can be performed using an up/down testing procedure, such as the 2-up-1-down testing procedure depicted in Table 1. However, it is again noted that various other testing procedures can also be utilized without departing from the scope of the present disclosure. Additionally, the example above makes reference to a scenario in which the parameter that is being changed as the "step size" comprises the hearing age used to generate the simulated hearing age sample. However, in some embodiments, one or more additional (or alternative) parameters can be adjusted based on the step size changes associated with the presently disclosed perceptual processing hearing ability test. For example, the same or similar approach as described above can also be used to determine a listener's absolute threshold(s) in one or more bands, in which case the step size adjustments between rounds of the hearing test could be provided as decibel (dB) steps rather than numerical hearing age steps. It is again noted that both numerical/hearing age and decibel levels are provided for purposes of example and are not intended to be construed as limiting—one or more other adjustable parameters can be configured or adjusted based on the step size, without departing from the scope of the present disclosure.

Returning now to the discussion of Table 1 (e.g., depicting an example of a 20-round perceptual processing hearing ability test), the perceptual processing hearing ability test can be performed by using the step size to adjust the simulated hearing age up or down, and moreover, can be performed by adjusting the step size itself up or down. For example, the step size is depicted as initially being configured as a 20-year increment, before being decreased to a 5-year increment, and finally a 2.5-year increment. In some embodiments, an initial phase of the perceptual processing hearing ability test can be performed until a pre-determined and/or minimum step size is achieved (e.g., which here, is the final step size of 2.5 years).

In some embodiments, the step size adjustments can be performed independent of the previously described "initial phase." For example, as depicted in Table 1 above, the step size can be configured to a starting value (e.g., shown here as a step size of 20-years). The starting step size can be maintained until the listener provides their first incorrect response, which here occurs in testing round 6. In response to the listener's first incorrect response, the step size can be decreased (e.g., shown here as decreasing from 20-years to 5-years). This intermediate step size of 5-years can then be maintained through subsequent testing rounds until the listener provides a correct response, which in this example occurs in round 8. The step size can then be decreased again (e.g., shown here as decreasing from 5-years to 2.5-years).

Note that the final step size decrease (e.g., to the final step size value of 2.5-years) does not necessarily occur in the testing round immediately following the listener's correct response. Recalling that presently disclosed perceptual processing hearing ability test may be performed using a 2-down-1-up procedure, the step size can be adjusted during the next downward or upward move in the step value itself (e.g., the next downward or upward move in simulated hearing age). Therefore, although the step size decrease to the final step size value of 2.5-years is triggered by the listener's correct response in round 8, the step size decrease is not actually implemented until round 9 (e.g., after the listener has provided two correct responses in a row, and the simulated hearing age value is stepped down).

Returning to the discussion of the example perceptual processing hearing ability test depicted in Table 1 above, in some embodiments the 2-down-1-up testing procedure (and/or other testing procedure/paradigm used to perform the perceptual processing hearing ability test) can be performed through consecutive rounds until one or more termination triggers or termination criteria are met. In one illustrative example, the perceptual processing hearing ability test can be performed until a certain number of reversals have been detected after the smallest/minimum step size is achieved. For instance, in some embodiments the perceptual processing hearing ability test can be performed until eight reversals have occurred after the minimum step size of 2.5 years has been achieved, although it is noted that this example is not intended to be construed as limiting and other termination triggers/criteria may also be utilized without departing from the scope of the present disclosure.

Upon the termination of the presently disclosed perceptual processing hearing ability test, the tested listener's hearing age can be determined based on the test results (e.g., the listener's results over one or more (or all) rounds of the hearing ability test). For example, when the test is performed until eight reversals have occurred after the minimum step size has been reached, the listener's hearing age can be determined as the average of the last four reversals—although it is again noted that various other approaches can also be utilized to determine an estimated hearing age for the listener, without departing from the scope of the present disclosure.

In an example where the listener's hearing age is estimated based on the average of the last four reversals, the listener associated with the 20-round perceptual processing hearing test depicted in Table 1 above could have their hearing age estimated as the average of 47.5, 42.5, 47.5, and 45 (e.g., the last four reversals of the test), or an estimated hearing age of 45.6. Although the foregoing discussion is provided in the context of estimating a listener's hearing age, it is noted that hearing age can be used as a proxy or estimator for one or more hearing thresholds for the listener. For example, using known thresholds associated with or demographically similar to the listener's estimated hearing age (e.g., such as the age-based threshold curves depicted in FIG. 1A), the listener's estimated hearing age determined using the presently disclosed perceptual processing hearing ability test can be used to provide or otherwise determine one or more estimated hearing thresholds for the given listener.

In some embodiments, the final estimation or hearing test results output based on the presently disclosed perceptual processing hearing ability test can be adjusted to include one or more uncertainty measures. For example, humans (e.g., the listener for a given instance of the presently disclosed perceptual processing hearing ability test) might be most accurately treated as a noisy detector, based on the observation that human test subjects rarely, if ever, have well-defined thresholds that will produce perfectly consistent results over a multi-round hearing test. Accordingly, in some embodiments the presently disclosed perceptual processing hearing ability test can be used to characterize a listener's hearing ability (e.g., in the example above, the estimated hearing age or threshold(s) of the listener) within one or more confidence levels. For example, the presently disclosed perceptual processing hearing ability test can provide results indicating that the tested listener has a hearing threshold (or other hearing ability) quantified as X, meaning that the tested listener will be able to detect at the threshold X at least Y threshold X at least Y % of the time.

In some embodiments, error and/or uncertainty can be reflected in the estimated hearing ability output by the presently disclosed perceptual processing hearing ability test based at least in part on adjusting the manner in which the listener's estimated hearing ability is calculated. For example, if one or more reversals (particularly reversals that would otherwise have been included in the final estimated hearing ability output/calculation) appear to be outliers, it is contemplated that the number of reversals used to calculate the listener's hearing ability can be adjusted. For instance, in the context of the example 20-round perceptual processing hearing ability test depicted in Table 1 above, the tested listener's hearing ability might instead be estimated/calculated using only the final three reversals at the smallest step size (e.g., 2.5-years), yielding an estimated hearing age of (47.5+42.5+47.5)/3=49.2-year-old estimated hearing age threshold(s).

Figure 4:
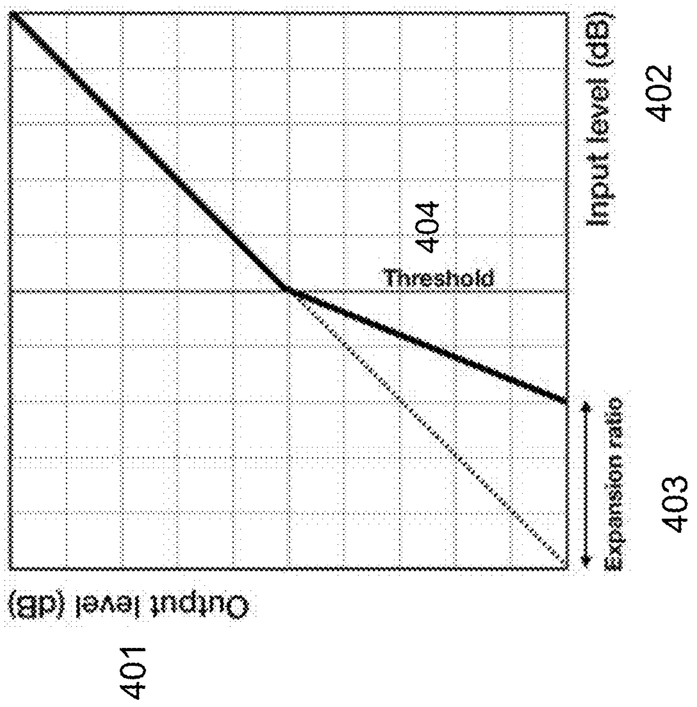
FIG. 4 illustrates an example of a dynamic range expander (DRE) that can be used to implement a perceptual processing hearing ability test, according to one or more aspects of the present disclosure.

FIG. 4 is a graph illustrating an example of an audio output that can be generated using a dynamic range expander. As illustrated, output level (dB) 401 is depicted on the y-axis and input level (dB) 402 is depicted on the x-axis. A dynamic range expander (DRE) can be used to increase (e.g., expand) the dynamic range of an audio input signal. For example, louder and quieter portions of the audio input signal may be relatively louder and quieter, respectively, in the output signal generated by applying one or more DREs. In some aspects, a DRE can be associated with a threshold (e.g., given in dB) that is indicative of the level at which dynamics processing will be applied (e.g., the level at which the DRE is activated). In particular, a DRE can be associated with a threshold (in dB) that indicates the dB level at which dynamic range expansion will be applied to a given input signal, based on the DRE acting upon the input signal.

A DRE that amplifies the level of the portion of an input signal that exceeds the threshold can be referred to as an upward expander or an upward DRE. For example, an upward DRE can amplify the portion of an input signal that is loud enough to cross the threshold. A DRE that attenuates the level of the portion of an input signal that falls below the threshold can be referred to as a downward expander or downward DRE. A downward DRE can attenuate the portion of the input signal that is quiet enough to fall below the threshold. For example, the graph of FIG. 4 corresponds to a downward DRE, as the output level (shown as the portion of the solid black line with a 5:2 slope/ratio) is attenuated below the level of the input signal (shown as the dotted black line with a 1:1 slope/ratio).

As illustrated in FIG. 4, the input signal and output signal are approximately equal for input levels above the threshold 404 (e.g., to the right of threshold 404). The slope of the solid black line above the threshold 404 is 1:1, as noted above. For input levels below the threshold 404 (e.g., to the left of threshold 404), the input signal level and the output signal level are not the same, based on the DRE attenuating the level of the output signal to be below the level of the input signal. The slope of the solid black line below the threshold 404 is approximately 5:2, as noted above.

This slope of the input-output relationship can also be referred to as the expansion ratio of the DRE. For instance, above the threshold 404, the expansion ratio is 1, and the level of the output signal grows equally with the level of the input signal. Below the threshold 404 (e.g., when the DRE processing is activated), the relationship between the input and output levels changes, and is no longer unity. In particular, the expansion ratio below the threshold 404 is greater than one (e.g., because dynamic range expansion is applied; an expansion ratio of less than one would be the result of applying dynamic compression). In some aspects, the value of the expansion ratio can indicate the rate at which attenuation is applied to the input signal when the DRE performs dynamic range expansion. For example, the expansion ratio of 5:2 illustrated in FIG. 4 indicates that the level of the input signal will be reduced (e.g., attenuated) by 5 dB for every 2 dB that the input signal goes below the threshold 404. Alternately, the expansion ratio of 5:2 indicates that the level of the input signal is reduced by 2.5 dB for every dB the input signal goes below threshold 404.

Figure 5:
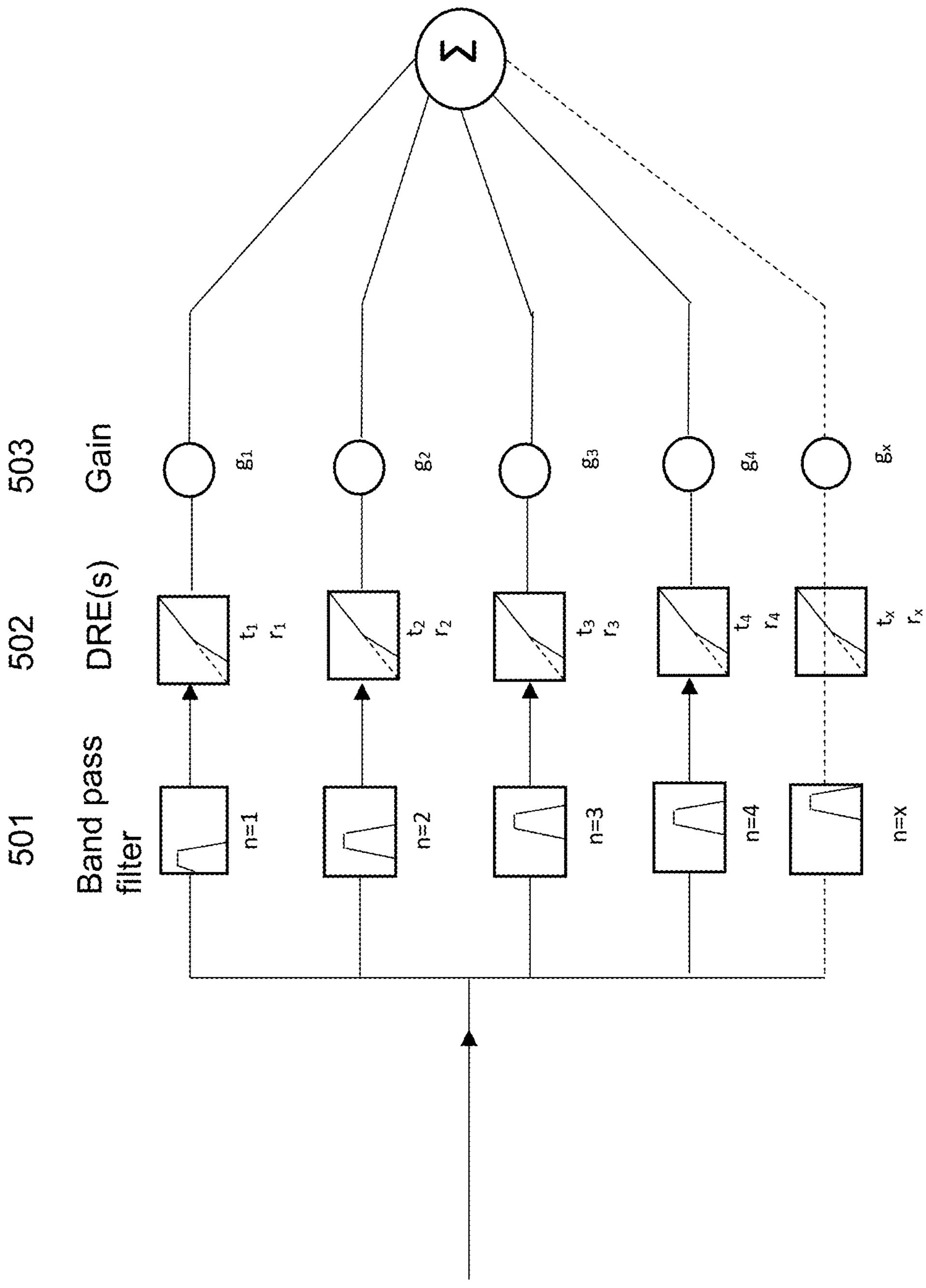
FIG. 5 illustrates an example multiband dynamics processor that includes a dynamic range expander (DRE) in each subband and that can be used to implement a perceptual processing hearing ability test, according to one or more aspects of the present disclosure.

FIG. 5 further illustrates a multi-band dynamic processor with a dynamic range expander (DRE) 502 in each subband n of a plurality of subbands 501 generated for a given input signal. In some examples, each subband n can include, apply, or otherwise be associated with a respective gain 503. In some examples, one or more (or all) of the subbands n can omit gain 503, and may each include a respective band pass filter 501 and DRE(s) 502. For example, each subband n of the plurality of subbands 501 can be associated with a different center frequency and/or frequency range. By including at least one DRE 502 for each subband of the plurality of subbands 501, an output signal can be generated to simulate a given user's perception of the input signal (e.g., the output signal can be attenuated based on hearing model or other specific hearing information of the user). For example, the simulation of the hearing information lost by a certain user (or lost by a certain age model of hearing loss, such as a 50-year-old hearing model or a 70-year-old hearing model, etc.) can be simulated based on masking information and absolute threshold information. Both masking and absolute threshold are elements of human hearing that may become worse with increasing hearing loss (e.g., as described above with respect to FIGS. 1A and 1B).

As illustrated, each of the DREs 502 can include one or more characterizing parameters, which can include (but is not limited to), one or more of a threshold level $t_n$ and/or an expansion ratio $r_n$. The net effect of a dynamic range expander is to make input sounds below a given threshold quieter while keeping sounds above a certain threshold at the same level or louder. The net effect is widening of the dynamic range of the input signal.

For example, if it is known that a certain listener can hear things above a certain threshold, but cannot hear things below that threshold, then this absolute threshold information can be used to set DRE thresholds. In particular, the DRE threshold (for a downward DRE, such as that illustrated in FIG. 4) can be set to be the same as (or similar to) the absolute threshold of the user/hearing age/hearing model that is being simulated in the output signal generated using the multi-band dynamics processor of FIG. 5.

Similarly, masking can be simulated using the DREs 502. Masking may exhibit at least a partial dependency on the energy in a given signal—for example, masking describes how energy at a first frequency can render energy at a second frequency inaudible to a listener (e.g., by "masking" the energy at the second frequency). As hearing deteriorates, the effects of masking can become more effective, in which the influence of one frequency on another becomes more pronounced.

In one illustrative example, the threshold for each respective DRE 502 can be determined as the maximum of the calculated masked threshold and the absolute threshold at each point in time in each subband. For instance, the masked threshold for each subband can be calculated according to a model such as that defined by the MPEG Layer III audio encoding (MP3) specification.

In some embodiments, the masked threshold can be calculated based on the input audio signal and the hearing parameters of the individual (or hearing age) being simulated in the output signal. In some aspects, when the masked threshold is determined using the MP3 specification model, the MP3 model may be modified to include one or more additional parameters. For example, the MP3 model may be modified to include an additional parameter that changes the spread of masking based on the hearing condition that is being simulated.

In some cases, threshold parameter information can have a greater impact than the DRE ratio on the efficacy and/or accuracy of the hearing simulation that is depicted by the generated output signal. The DRE ratio is a parameter that can be fixed, or that can be tuned to reduce the quantity of audible artifacts present in the output audio signal—in some cases, a gate could be used, which can be considered a DRE with an infinite ratio (e.g., sound is simply muted below the threshold). However, the use of a DRE to create a more gradual fall off of the sound level below the threshold can create a more natural simulation of the intended listener or hearing age (e.g., because the DREs 502 can be used to simulate the hearing of a given individual and/or to simulate the hearing of a given hearing age, as described above in the context of the presently disclosed perceptual processing hearing ability test). For example, the use of a DRE (as compared to a gate or a DRE with an infinite ratio) can prevent or reduce the presence of sound artifacts in the output, simulated signal. In some embodiments, preventing or reducing sound artifacts in the simulated output can be desirable based on the presently disclosed perceptual processing hearing ability test being presented to listeners who are trying to discriminate between an unmodified audio sample and a simulation of a particular hearing loss (as applied to the same audio sample) that is close to the listener's own level of hearing loss. In some embodiments, one or more (or all) of the DREs 502 can utilize one or more pre-determined thresholds to simulate a given listener's hearing and/or a given hearing age, when the simulation is based only on absolute thresholds or otherwise does not include the effects of masking.

In some aspects, in order to simulate the effects of masking, the DREs 502 are unable to use only pre-determined or fixed thresholds—because masking depends at least in part on the particular audio signal under test (e.g., the given input signal to the multi-band dynamics processor illustrated in FIG. 5). In particular, the DREs 502 are not configured with fixed thresholds when masking is simulated in the output signal, but instead are configured with a series of threshold values that vary over time and frequency (e.g., with the variation based at least in part on the particular content of the audio signal for which the masking is simulated).

In one illustrative example, the systems and techniques described herein can use one or more pre-determined sound files (e.g., input audio signals) to perform the presently disclosed perceptual processing hearing ability test(s). In such examples, the pre-determined sound files can be rendered in advance to simulate various different hearing ages, hearing conditions, etc. In other illustrative examples, when a user (e.g., listener or test subject of the perceptual processing hearing ability test) is able to select any music, content, or audio of their choosing as the input signal, then a masking model (e.g., the MP3 model and/or the modified MP3 model, as described above) can be run on the selected user content and the DREs 502 can be configured using threshold and/or ratio parameters that are determined based on the output of running the masking model for the user-selected input audio signal. For example, the masking model and the DRE threshold/ratio configuration can both be performed on a smartphone or other computing device used to implement the presently disclosed perceptual processing hearing ability test(s).

For example, in some embodiments the entirety of an audio clip selected by a user can be processed ahead of time or otherwise in advance of the user taking the perceptual processing hearing ability test. The advance processing of a user selected audio clip can be performed locally (e.g., on the device that will be used to perform the perceptual processing hearing ability test), such as by using the local device to perform offline processing of the user selected audio clip in order to determine the masked thresholds. In some examples, the advance processing of the user selected audio clip can be performed remotely (e.g., the user selection of an audio clip, or the audio clip itself, can be transmitted to a remote server which performs the processing and transmits the masked thresholds back to the local device for performing the perceptual processing hearing test).

In some examples, a simulated hearing age output signal can be generated (e.g., based on an unmodified input signal) by using one or more (or all) of the DREs 502 to apply dynamic range expansion in the corresponding subband n associated with each respective DRE. In some cases, one or more of the DREs 502 may be inactive at certain points in time and/or for certain input signals and/or desired simulated hearing age and characteristics. For example, when a given one of the DREs 502 is inactive for a given moment in time, the threshold of the given DRE can be set above the actual level of the audio content during that given moment of time (e.g., such that the given DRE is not activated and has no effect on the output).

Figure 6:
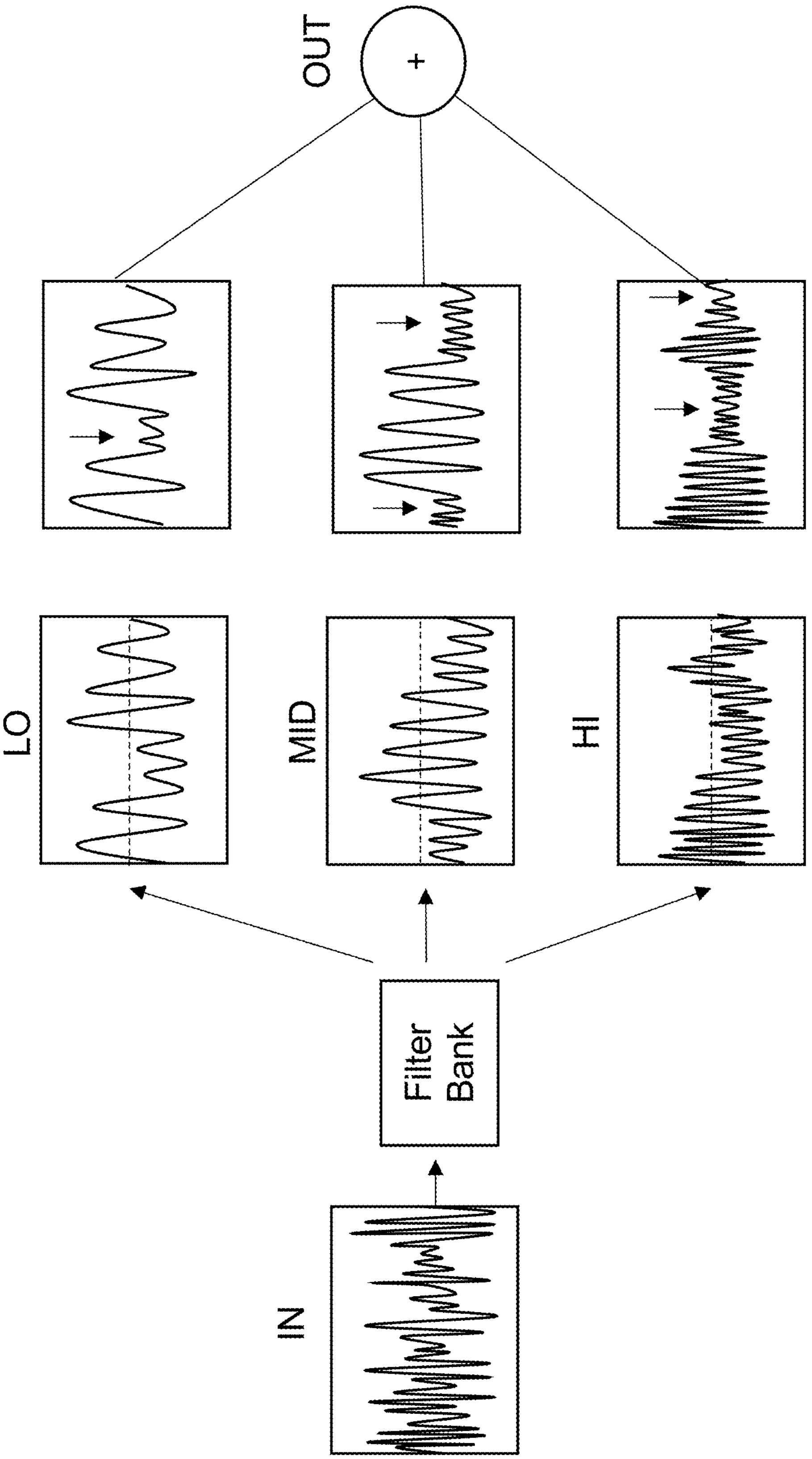
FIG. 6 illustrates an example of a simple, transformed audio signal that may be generated by using one or more dynamic range expanders (DREs) to widen the dynamic range of an input signal, according to one or more aspects of the present disclosure.

An example of the widened dynamic range that can be achieved by applying one or more dynamic range expanders (e.g., the same as or similar to the DREs 502 described above with respect to FIG. 5) to the subbands of an input signal is illustrated in FIG. 6. The use of dynamic range expanders in processing may recreate the perceptual effects of hearing impairment by artificially "increasing" the hearing thresholds of listeners and "broadening" their masking contour curves. This would then enable a method to ascertain a user's hearing profile by matching the user's perception of differences between audio samples through a simple selection interface.

Figures 7A, 7B:
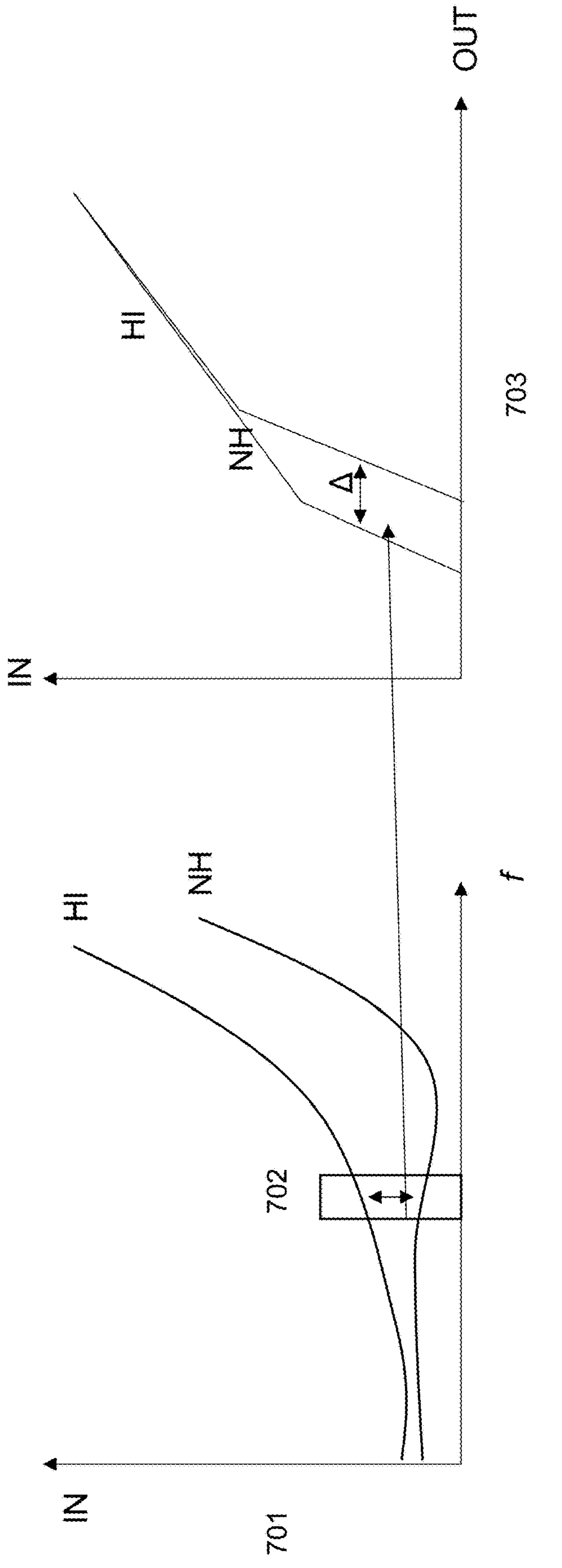
FIG. 7A illustrates an example of hearing threshold curves of a normal-hearing (NH) listener and a hearing-impaired (HI) listener.
FIG. 7B illustrates an example of dynamic range expander (DRE) input and output profiles that can be used to perceptually recreate (e.g., measure or otherwise determine) threshold differences between a normal-hearing (NH) listener and a hearing-impaired (HI) listener.

FIGS. 7A and 7B are graphs illustrating an example of the recreation or simulation of the perceptual effects of hearing impairment for measuring hearing thresholds. For example, FIG. 7A illustrates the hearing threshold curves 701 of a normal hearing user (NH) and a hearing-impaired user (HI), and in particular shows that the NH and HI hearing threshold curves can include a plurality of different frequency bands, such as the one exemplary frequency band 702. In order to perceptually recreate the threshold differences between the NH and HI listeners (e.g., to generate an output signal that simulates, to the NH listener, how the HI listener hears or perceives a given input audio signal), one or more dynamic range expanders (DREs) may be used with the input and output profiles shown in FIG. 7B.

More particularly, FIG. 7B illustrates input and output profiles 703 for a DRE that may be applied within the frequency band 702 that is depicted in FIG. 7A (e.g., in the context of using the DREs for absolute threshold alone, recalling that fixed threshold value(s) can be used for DREs when masking is not simulated, but not when masking is simulated). Here, the vertical delta between the HI and NH hearing threshold curves depicted in FIG. 7A is the same as the horizontal delta between the HI and NH listeners as depicted in FIG. 7B. In one illustrative example, the DRE can be configured by shifting (e.g., increasing) the NH threshold value (e.g., the point in FIG. 7B at which the NH input-output profile changes slope, from a value of ~1 to a value >1) to the right in order to recreate the same input differential or delta that is shown in FIG. 7A between the HI and NH hearing threshold curves.

Notably, as illustrated in FIG. 7B, the slopes of the expanders do not change. To this extent, sounds that were once audible to the NH user may no longer be audible as threshold values shift by Δ. Recreating this on a frequency band-by-band level (e.g., using the multi-band dynamic processor with a DRE in each subband, as illustrated in FIG. 5) for every transformed sample of an audio sample could then, through enough sample choices, allow for the recreation of an audiogram (e.g., such as that of FIG. 1A) by adjusting the threshold values per frequency band per transformed sample and then calculating a threshold curve based on DRE Δ values.

For instance, after suitable DRE parameters (e.g., thresholds) have been determined for each DRE/subband associated with processing a given input signal, an output signal can be generated that simulates, for the NH listener, the HI curve shown in FIG. 7A—for instance, the transformed NH curve would look the same as or similar to the HI curve, based on applying the configured DREs to a given input signal.

In some aspects, the one or more DREs can be applied to a given input signal to simulate a specific loss, e.g., a loss at a specific frequency and time. For example, the application of different DREs/DRE parameters on a frequency band-by-band level can account for simulating loss at different specific frequencies, and the application of different DRE parameters for different portions of the audio input signal can account for simulating loss at different specific times. In some embodiments, the DREs can be used to map one hearing condition to another—if a test subject (e.g., listener) is able to discriminate between a sound played with and without a given DRE (e.g., the HI DRE of FIG. 7B) applied to the same input signal, then it can be inferred or concluded that the test subject's hearing is not as bad as the HI model being used to simulate that specific loss (or hearing age).

In some embodiments, if the test subject is unable to discriminate or otherwise detect a difference between two simulated levels of hearing loss (e.g., two different simulated HI losses, or one NH and one HI), then the test subject's own auditory system has stripped away (due to the test subject's hearing loss) more information than the DREs have, and it can be inferred or concluded that the test subject likely has hearing loss that is more severe than the worse of the two simulations presented.

Figure 8A:
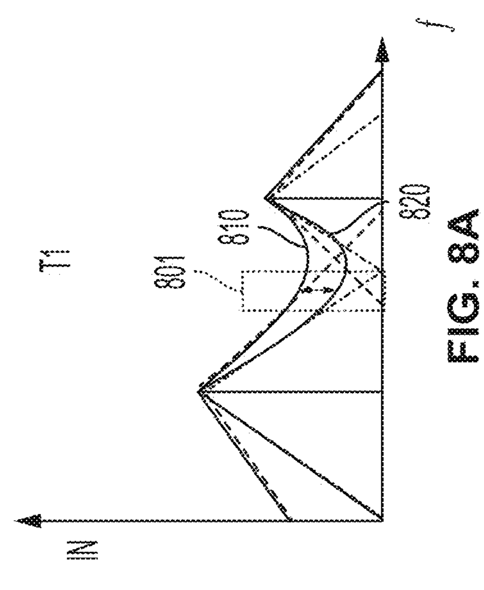
FIG. 8A illustrates an example of NH and HI masking contour curves at a first time in a first frequency band.

FIGS. 8A-D are diagrams illustrating examples of determining a user's masking contour curves based on one or more dynamic range enhancer (DRE) values. For example, FIG. 8A is a diagram illustrating a masked threshold (MT) curve 820 of a normal hearing (NH) user and an MT curve 810 of a hearing-impaired (HI) user. An input signal level (e.g., in dB, etc.) is represented on the y-axis and frequency is represented on the x-axis. As illustrated, the normal hearing MT curve 820 is generally equal to or below the hearing-impaired MT curve 810, for example recalling that a user's thresholds may become higher with age and/or as hearing otherwise deteriorates or becomes impaired (e.g., as described above with respect to the example age-based MT curves illustrated in FIG. 1B).

The frequency range associated with the MT curves 810 and 820 (e.g., the horizontal width of the two MT curves along the frequency axis) can be divided into a plurality of subbands. For example, FIG. 8A depicts a subband 801 that can be included in the plurality of subbands (e.g., where the remaining subbands can be equally sized and/or differently sized than subband 801). For each respective subband included in the plurality of subbands, a delta value can be determined between the normal hearing MT curve 810 and the hearing-impaired MT curve 820. For example, FIG. 8A illustrates the delta between the normal hearing and the hearing-impaired MT curves within subband 801 as the two-sided vertical arrow between normal hearing MT curve 810 and hearing-impaired MT curve 820.

Figure 8B:
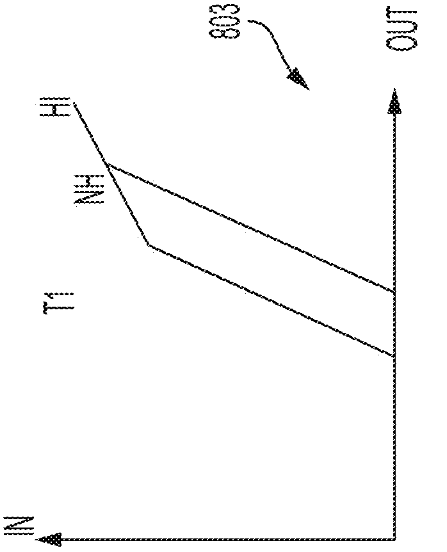
FIG. 8B illustrates an example of a first set of DRE input and output profiles that can be used to perceptually recreate (e.g., measure or otherwise determine) the threshold differences illustrated in the NH and HI masking contour curves of FIG. 8A at the first time in the first frequency band.

In one illustrative example, a simulated hearing loss can be generated to approximate the hearing differences between the user associated with normal hearing MT curve 810 and the user associated with hearing-impaired MT curve 820 using one or more DREs. For instance, FIG. 8B is a diagram illustrating input and output profiles that can be used by one or more DREs. For example, the DRE profiles depicted in FIG. 8B can be associated with a DRE that is used to perform audio processing for subband 801 (e.g., can be associated with one of the plurality of DREs 502 illustrated in FIG. 5 for the corresponding plurality of subbands n). To recreate the difference between the normal hearing MT curve 810 and the hearing-impaired MT curve 820, the input/output DRE profile can be shifted from the NH profile to the HI profile. In other words, to recreate, for a normal hearing (NH) user, the hearing impairment of the user associated with hearing-impaired MT curve 820, the normal hearing user's DRE input/output profile for a given subband can be shifted to the right, based on the delta that was determined between the NH MT curve 810 and the HI MT curve 820 for the same given subband (e.g., as described with respective to FIG. 8A). In some embodiments, the delta determined between the NH MT curve 810 and the HI MT curve 820 can be the same as the delta used to shift the NH DRE input/output profile to the recreated HI DRE input/output profile, e.g., as illustrated in FIG. 8B.

Figure 8C:
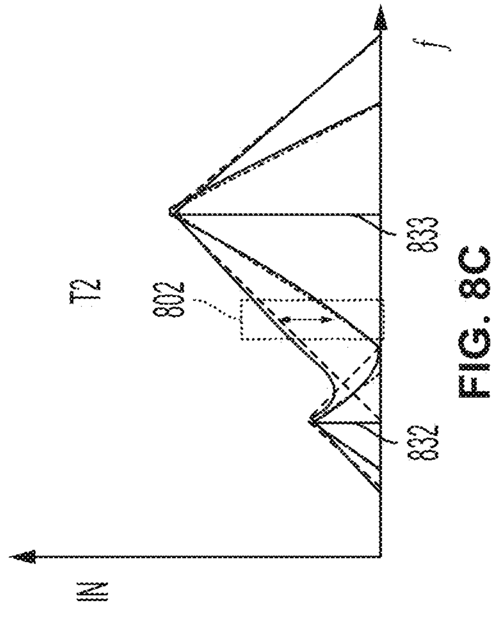
FIG. 8C illustrates an example of NH and HI masking contour curves at a second time in a second frequency band.
Figure 8D:
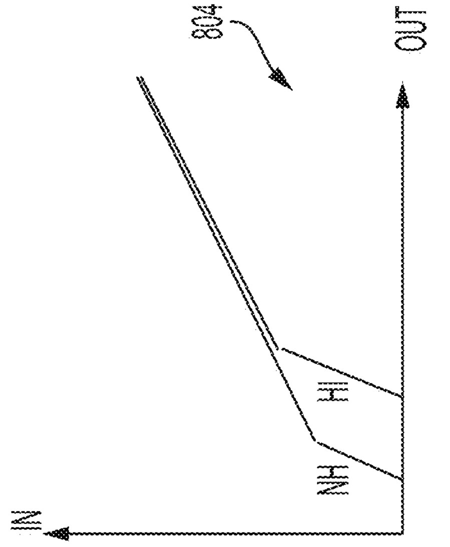
FIG. 8D illustrates an example of a second set of DRE input and output profiles that can be used to perceptually recreate (e.g., measure or otherwise determine) the threshold differences illustrated in the NH and HI masking contour curves of FIG. 8C at the second time in the second frequency band.

FIGS. 8C and 8D depict another example of MT curves associated with an NH user and an HI user, as well as a corresponding DRE shift that can be applied based on a delta between the NH and HI MT curves within a given subband. For example, FIGS. 8C and 8D can be the same as or similar to that described above with respect to FIGS. 8A and 8B, with FIGS. 8C and 8D utilizing two different inputs (e.g., 832, 833). At time T1 at frequency band 701, the dynamic range expanders have the input/output profiles featured in 803. At time T2 at frequency band 802, the dynamic range expanders have the input/output profiles featured in 804. Using the same logic as applied to discerning threshold values in FIG. 7 in reconstructing an audiogram (FIG. 1A), a masking contour curve may also be constructed (FIG. 2A). The same logic of using DRE Δ values can be applied to map out these estimates.

Figure 9B:
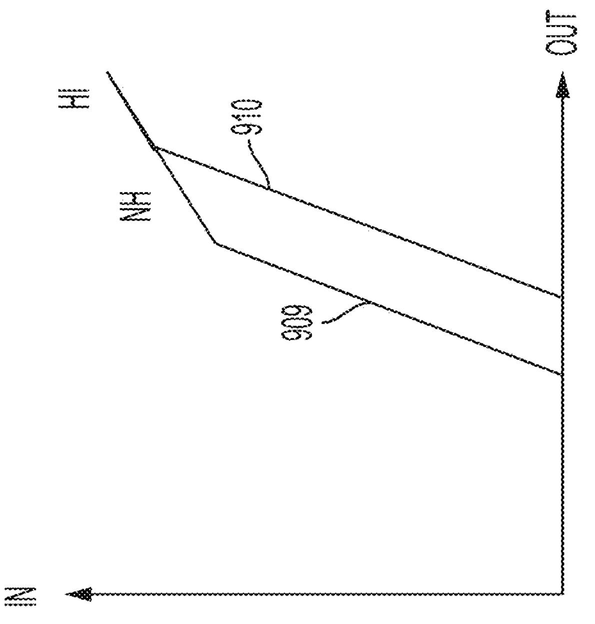
FIG. 9B illustrates an example of a set of DRE input and output profiles that can be used to perceptually recreate (e.g., measure or otherwise determine) both the hearing threshold curves and the masking contour curves of FIG. 9A.
Figure 9A:
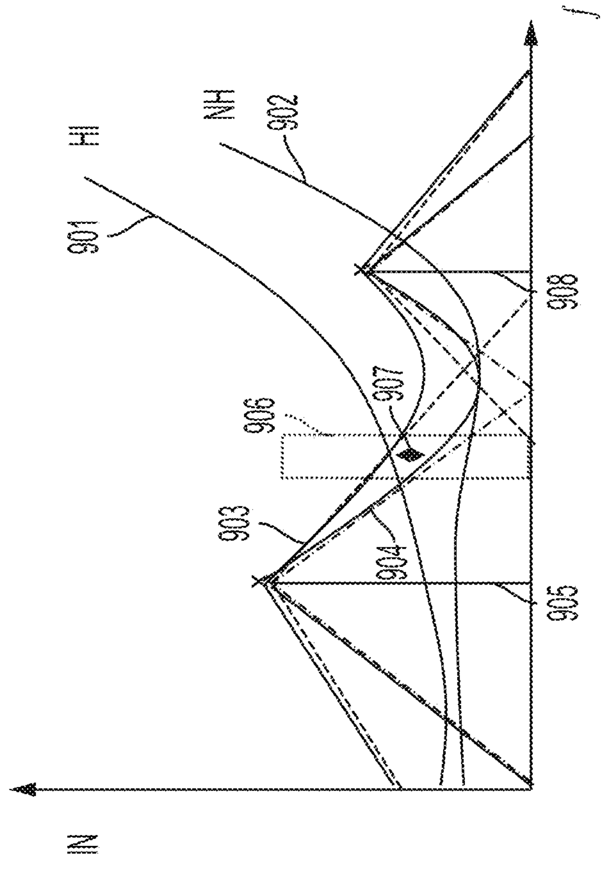
FIG. 9A illustrates an example of NH and HI hearing threshold curves and NH and HI masking contour curves.

FIGS. 9A and 9B are diagrams illustrating an example in which both threshold values and masking contour curves can be measured or otherwise determined using one or more DREs. For example, in some embodiments, a user's MT and pure tone threshold (PTT) curves can be determined based on one or more DRE values. As illustrated, FIG. 9A includes a hearing-impaired (HI) threshold hearing curve 901 and a normal hearing (NH) threshold hearing curve 902. For instance, the HI threshold hearing curve 901 can be the same as or similar to the HI threshold hearing curve illustrated and described above with respect to FIG. 7A. Similarly, the NH threshold hearing curve 902 can be the same as or similar to the NH threshold hearing curve illustrated and described above with respect to FIG. 7B.

FIG. 9A further depicts a first audio input 905 and a second audio input 908. A user's normal hearing (NH) MT curve is denoted at 904 and a user's hearing-impaired (HI) MT curve is denoted at 903. In some aspects, the NH MT curve 904 can be the same as or similar to the NH MT curve 810 illustrated in FIG. 8A and described above. In some cases, the HI MT curve 903 can be the same as or similar to the HI MT curve 820 illustrated in FIG. 8A and described above.

For a given subband 906 (e.g., included in a plurality of same or similar subbands used to divide some or all of the frequency range/bandwidth shown in FIG. 9A), one or more delta values can be determined. For example, the delta 907 depicted in FIG. 9A can be determined between the MT and/or PTT curves 903, 901 (respectively) of the HI user and the MT and/or PTT curves 904, 902 (respectively) of the NH user. In some examples, delta 907 can be determined as the lesser of the delta between MT curves 903 and 904 and the delta between PTT curves 901 and 902. In some examples, then delta 907 can include both an MT delta value (e.g., the delta between MT curves 903 and 904) and a PTT delta value (e.g., the delta between PTT curves 901 and 902). In some cases, delta 907 can be determined based on various combinations of the HI MT curve 903, HI PTT curve 901, NH MT curve 904, and/or NH PTT curve 902 values that are included in or otherwise associated with the given subband 906. Based on the one or more delta values determined between the NH and HI MT and/or PTT curves (e.g., delta 907), the difference in hearing between the NH user and the HI user can be recreated by shifting the DREs 909 (e.g., NH DRE) and 910 (e.g., HI DRE) based on the delta value 907.

Figure 10:
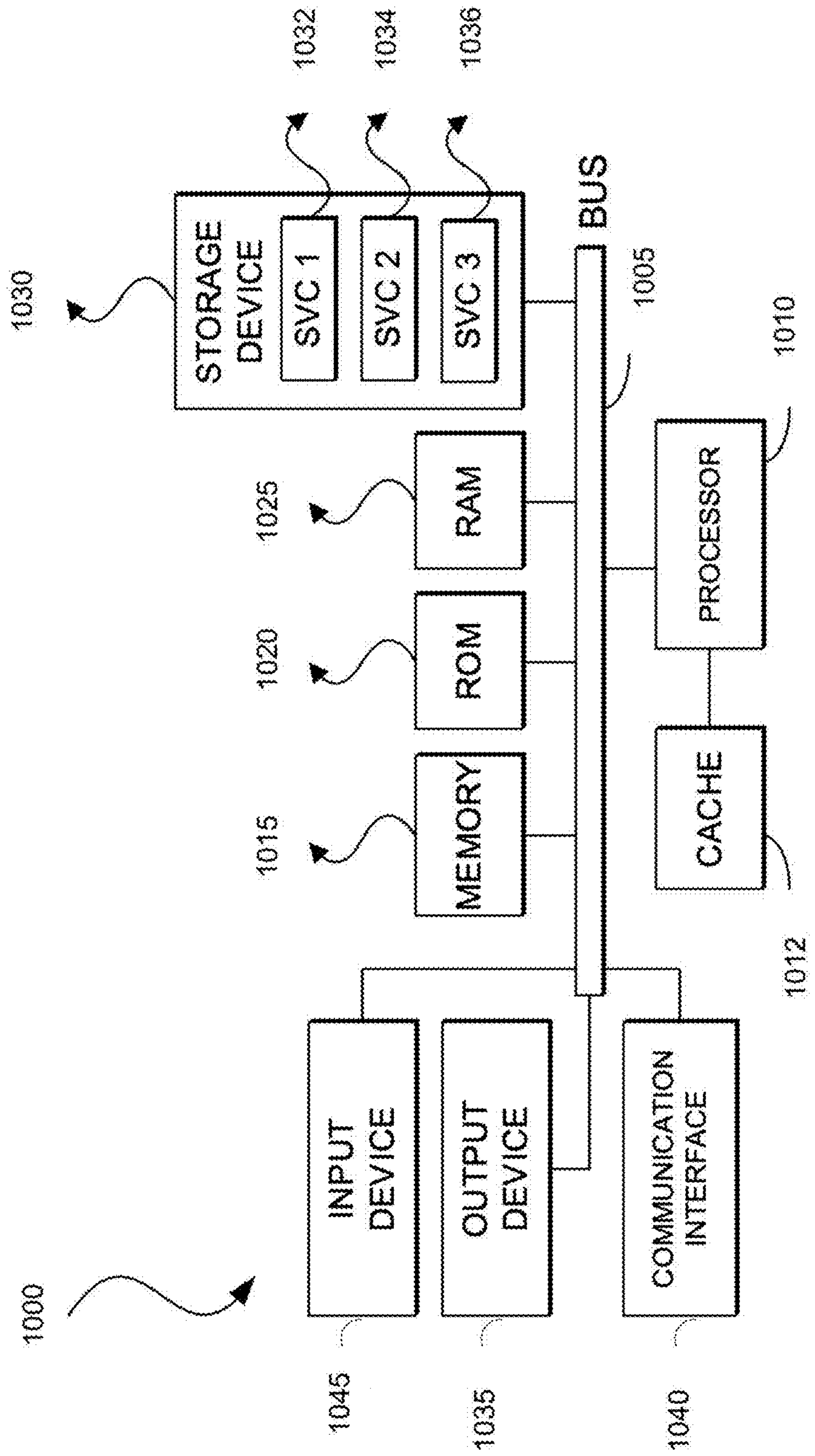
FIG. 10 illustrates an example system for implementing certain aspects of the present technology, according to some aspects of the present disclosure.

FIG. 10 illustrates a computing system architecture, according to some aspects of the present disclosure. Components of computing system architecture 1000 are in electrical communication with each other using a connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random-access memory (RAM) 1025 to processor 1010. Computing system 1000 can include a cache of high-speed memory 1012 connected directly with, in close proximity to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of audio processing, the method comprising:

obtaining a first set of digital signal processing (DSP) parameters associated with a first hearing profile, the first set of DSP parameters including first dynamic range enhancer (DRE) threshold information corresponding to a first hearing age;

obtaining a second set of DSP parameters associated with a second hearing profile, the second set of DSP parameters including second DRE threshold information corresponding to a second hearing age different than the first hearing age;

outputting one or more differentially processed audio samples for a frequency range, each respective differentially processed audio sample of the one or more differentially processed audio samples including:

a first audio output signal having the frequency range and generated based on processing a first audio signal using one or more dynamic range enhancers (DREs) parameterized by the first DRE threshold information to simulate a perceptual hearing impairment corresponding to the first hearing age, wherein the one or more DREs apply a first dynamic range expansion to the first audio signal according to the first DRE threshold information; and a second audio output signal having the frequency range and generated based on processing a second audio signal using one or more DREs parameterized by the second DRE threshold information to simulate a perceptual hearing impairment corresponding to the second hearing age, wherein the one or more DREs apply a second dynamic range expansion to the second audio signal according to the second DRE threshold information;

obtaining, for each respective differentially processed audio sample, a respective user input indicative of the first audio output signal having a lower audio quality or indicative of the second audio output signal having a lower audio quality; and determining one or more user hearing thresholds based on the respective user input obtained for each respective differentially processed audio sample.

2. The method of claim 1, wherein determining the one or more user hearing thresholds comprises determining a user hearing age.

3. The method of claim 1, wherein:

the first audio output signal includes audio samples in each subband of a plurality of subbands within the frequency range; and the second audio output signal includes audio samples in each subband of the plurality of subbands within the frequency range.

4. The method of claim 3, wherein:

the one or more user hearing thresholds are determined based on a DRE threshold of a DRE associated with the lower audio quality signal included in each respective differentially processed audio sample.

5. The method of claim 1, wherein the first audio signal and the second audio signal are the same.

6. The method of claim 1, wherein the first audio signal comprises a first time portion of an audio sample having the frequency range, and wherein the second audio signal comprises a second time portion of the audio sample, wherein a set of frequency bands included in the first audio signal is the same as the set of frequency bands included in the second audio signal.

7. The method of claim 6, wherein the first time portion and the second time portion are consecutive non-overlapping time portions of the audio sample, and wherein the first time portion and the second time portion each have the frequency range.

8. The method of claim 1, wherein:

the first hearing profile is a baseline healthy hearing profile; and the second hearing profile is a hearing-impaired (HI) hearing profile.

9. The method of claim 8, wherein:

the second hearing age is greater than the first hearing age; and the perceptual hearing impairment simulated corresponding to the second hearing age exceeds the perceptual hearing impairment simulated corresponding to the first hearing age.

10. The method of claim 8, wherein each respective differentially processed audio sample includes:

the same first audio output signal generated based on the baseline healthy hearing profile; and a different second audio output signal generated using a selected HI hearing profile different than the baseline healthy hearing profile.

11. The method of claim 10, wherein:

a second differentially processed audio sample is generated using a selected HI hearing profile that is selected based on the respective user input obtained for a first differentially processed audio sample; and the selected HI hearing profile of the second differentially processed audio sample is associated with a second hearing age that is adjusted relative to a first hearing age associated with a first HI hearing profile of the first differentially processed audio sample.

12. The method of claim 11, wherein:

the second hearing age is selected to be greater than the first hearing age based on determining that the respective user input obtained for the first differentially processed audio sample correctly identified the lower audio quality signal.

13. The method of claim 1, wherein:

the second hearing age is selected to be less than the first hearing age based on determining that the respective user input obtained for the first differentially processed audio sample incorrectly identified the lower audio quality signal.

14. An apparatus for processing audio data, the apparatus comprising:

at least one memory; and at least one processor coupled to the at least one memory, the at least one processor configured to:

obtain a first set of digital signal processing (DSP) parameters associated with a first hearing profile, wherein the first set of DSP parameters includes first dynamic range enhancer (DRE) threshold information corresponding to a first hearing age;

obtain a second set of DSP parameters associated with a second hearing profile, wherein the second set of DSP parameters includes second DRE threshold information corresponding to a second hearing age different than the first hearing age;

output one or more differentially processed audio samples for a frequency range, each respective differentially processed audio sample of the one or more differentially processed audio samples including:

a first audio output signal having the frequency range and generated based on processing a first audio signal using one or more dynamic range enhancers (DREs) parameterized by the first DRE threshold information to simulate a perceptual hearing impairment corresponding to the first hearing age, wherein the one or more DREs apply a first dynamic range expansion to the first audio signal according to the first DRE threshold information; and a second audio output signal having the frequency range and generated based on processing a second audio signal using one or more DREs parameterized by the second DRE threshold information to simulate a perceptual hearing impairment corresponding to the second hearing age, wherein the one or more DREs apply a second dynamic range expansion to the second audio signal according to the second DRE threshold information;

obtain, for each respective differentially processed audio sample, a respective user input indicative of the first audio output signal having a lower audio quality or indicative of the second audio output signal having a lower audio quality; and determine one or more user hearing thresholds based on the respective user input obtained for each respective differentially processed audio sample.

15. The apparatus of claim 14, wherein:

the first audio output signal includes audio samples in each subband of a plurality of subbands within the frequency range; and the second audio output signal includes audio samples in each subband of the plurality of subbands within the frequency range.

16. The apparatus of claim 15, wherein:

the one or more user hearing thresholds are determined based on a DRE threshold of a DRE associated with the lower audio quality signal included in each respective differentially processed audio sample.

17. The apparatus of claim 14, wherein the first audio signal comprises a first time portion of an audio sample having the frequency range, and wherein the second audio signal comprises a second time portion of the audio sample, wherein a set of frequency bands included in the first audio signal is the same as the set of frequency bands included in the second audio signal.

18. The apparatus of claim 14, wherein:

the first hearing profile is a baseline healthy hearing profile; and the second hearing profile is a hearing-impaired (HI) hearing profile.

19. The apparatus of claim 18, wherein each respective differentially processed audio sample includes:

the same first audio output signal generated based on the baseline healthy hearing profile; and a different second audio output signal generated using a selected HI hearing profile different than the baseline healthy hearing profile.

20. The apparatus of claim 19, wherein:

a second differentially processed audio sample is generated using a selected HI hearing profile that is selected based on the respective user input obtained for a first differentially processed audio sample; and the selected HI hearing profile of the second differentially processed audio sample is associated with a second hearing age that is adjusted relative to a first hearing age associated with a first HI hearing profile of the first differentially processed audio sample.

* * * * *